Inventor:
Jörgen Helling

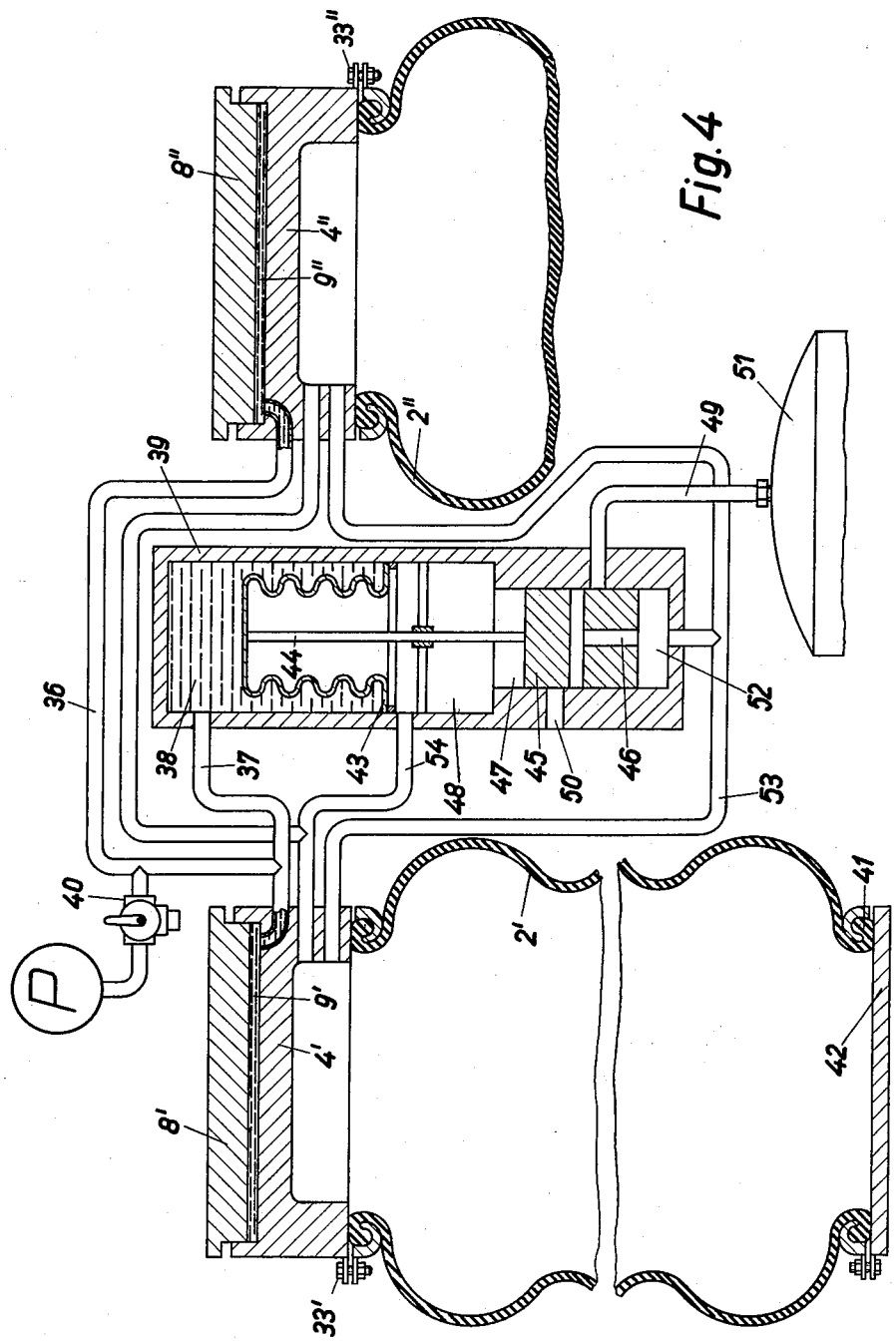

United States Patent Office 2,977,134
Patented Mar. 28, 1961

2,977,134

DEVICE FOR CONTROLLING THE AIR IN AIR SPRINGS, ESPECIALLY FOR MOTOR VEHICLES

Jürgen Helling, Essen-Heidhausen, Germany, assignor to Fried. Krupp Mortoren- und Kraftwagenfabriken G.m.b.H., Essen, Germany Filed Sept. 11, 1958, Ser. No. 760,487

Claims priority, application Germany Sept. 18, 1957

21 Claims. (Cl. 280—124)

The present invention relates to a method of and device for controlling the quantity of air in an air cushion of an air spring, especially for use in connection with motor vehicles. The purpose of controlling the air enclosed in such air cushion consists in obtaining a certain stretching or expansion of the spring member and, therefore, in connection with vehicles, a certain height of the cushioned parts over the road in a certain conformity with the load or also independent thereof.

Devices are known which through the intervention of a link system adjacent the air spring feel or sense the length of the air spring and by means of said link system act upon a control member which is intended to control the quantity of air in the air cushion in such a way that the length of the spring element will remain constant regardless of the static load acting upon the said spring element. The above mentioned problem is the only problem underlying the heretofore known devices of the type involved and the results are limited accordingly. Moreover, the said link system below the chassis is liable to damage by corrosion and by pebbles and stones on the road, and requires considerable service.

It is, therefore, an object of the present invention to provide an improved control arrangement for bellows, especially for use in connection with motor vehicles, which will overcome the above mentioned drawbacks.

It is another object of this invention to provide a method and device for controlling the quantity of air enclosed in an air cushion of an air spring, which will make it possible easily to vary the ratio between the pressure in the air cushion in the bellows and the load on the spring.

These and other objects and advantages of the invention will appear more clearly from the following specification in connection with the accompanying drawings, in which:

Fig. 1 by way of a graph illustrates the operation of the control mechanism according to the present invention.

Fig. 4 is a diagrammatic section through a further embodiment of the invention showing two air spring units in cooperation with a separate control cylinder unit.

General arrangement

Figure 1:
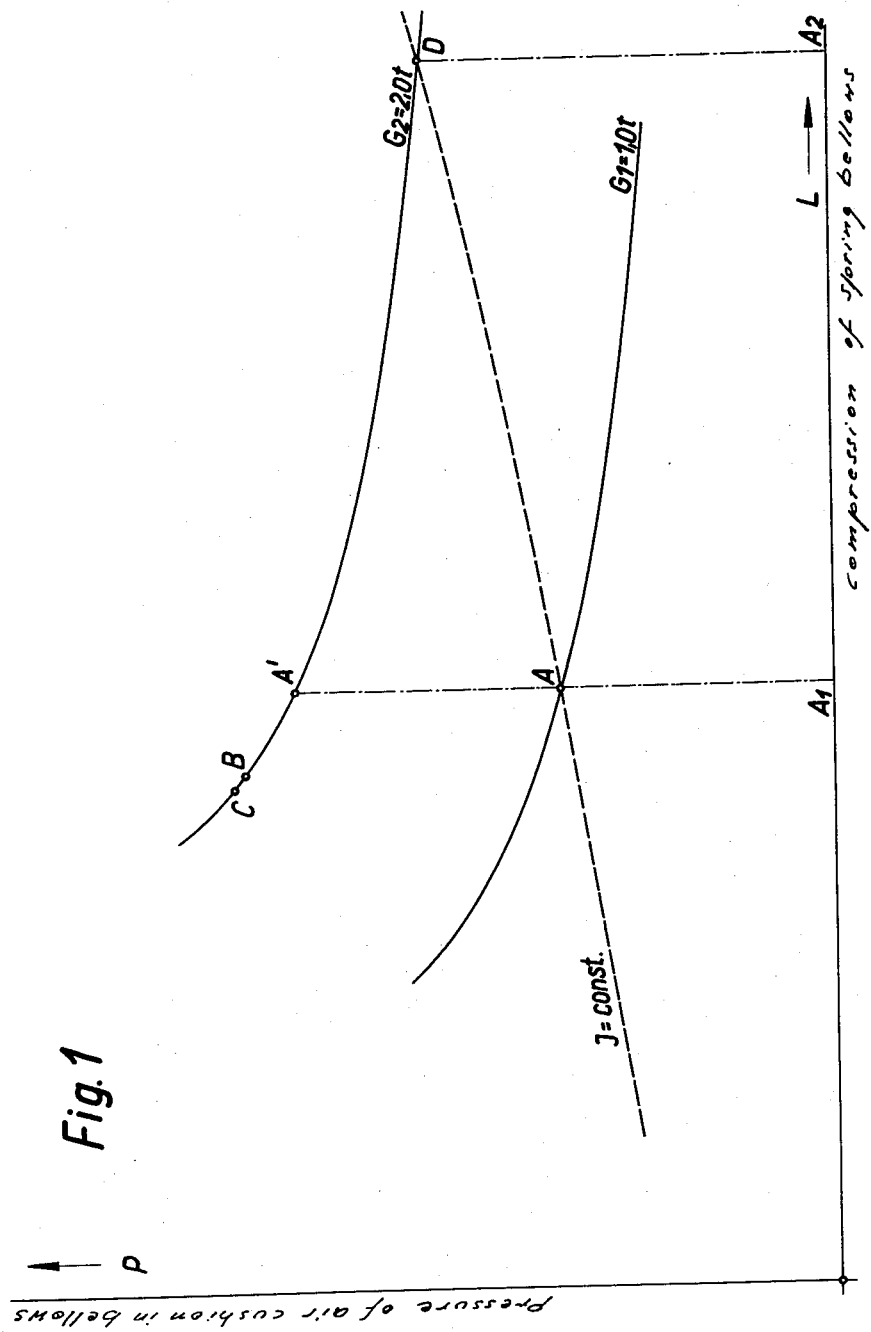

The present invention is based on the exploitation of the heretofore completely neglected fact that an elastic wall, for instance a diaphragm or a bellows, is adapted only then to absorb a pressing force acting perpendicularly thereto, for instance a resultant of a gas pressure, when a pulling force acting substantially perpendicularly to the pressing force to be absorbed acts upon the marginal portions of the elastic wall, and when at constant pressure, the magnitude of said pulling force is dependent on the bulging of the elastic wall. In the plane this problem has an analogy in the slack rope. A rope or cable extending for instance in horizontal direction will exert horizontal pulling forces upon its suspensions. At the same load of the rope or cable, these horizontal pulling forces depend on the extent to which the rope is slack or sags, in other words, these horizontal pulling forces are at a given length of the rope dependent on the distance of the suspension points.

An air spring bellows of an air spring has a certain bottom area to which the elastic bellows is connected. The product of this area and the air pressure of the air cushion acting upon said area yields the force acting upon said area. The pressure of the air cushion likewise acts upon the elastic wall of the bellows. The bulging of said elastic wall, especially when its length is constant, is dependent on the magnitude by which the belows is compressed in axial direction. Each surface element of the bellows wall is subjected to a gas pressure which produces pulling stresses effective at the marginal portion of the surface element, said pulling stresses confining an angle with each other thus producing a bulging of the bellows wall. In the marginal portion pertaining to the elastic bellows and being connected to the bottom surface there will act a pulling force the magnitude of which depends on the higher pressure of the air cushion over the surrounding pressure and is also dependent on the bulging of the wall, i.e. the compression of the bellows in axial direction, said pulling force being conveyed to said bottom surface through the connection of the bellows therewith. This force acts against the pressure acting upon the bottom surface so that the load which may be supported by the bellows spring will at constant air cushion pressure depend on the compression of the air spring in axial direction. This force will be all the greater, the further the bellows will be compressed. Vice versa, at constant load acting upon the spring bellows, the air pressure of the air cushion will be dependent on the compression of the spring bellows.

This finding concerning the relationship between load, compression and air cushion pressure of a spring bellows is, according to the present invention, exploited in such a way that the air pressure of the air cushion and the load acting upon the spring element act upon a control member adapted to control the quantity of air enclosed in said air spring member. In this connection, the control member will when the load is changed bring about a change in the quantity of entrapped air and thereby a change in the compression of the bellows, and thus of the pressure of the air cushion, so that a return movement effect of the control magnitude will be obtained and the control process will bring about a new condition of equilibrium, for instance at the same height of the bellows as prior to the change of load, whereupon the control process will be completed. In particular, in conformity with the present invention, the relationship between the air pressure of the air cushion and the load acting upon the spring element is controlled, especially held constant, in a certain manner in conformity with the load, said control being effected by a control member controlling the quantity of air enclosed in said air cushion. The said relationship between the air pressure acting on the air cushion and the load acting on the spring element may be selected at random in conformity with certain aspects or may be changed belatedly with a given construction by certain influences. In particular, this relationship may be so selected that (a) The control member exerts a control action to maintain constant the length of the bellows and thereby the height of the loading surface over the road regardless of the load.

(b) The said relationship may be so selected that the control member maintains the natural oscillating frequency constant independent or regardless of the load acting on the vehicle.

(c) The said relationship may be so selected that the control member will cause the cushioning of the spring to remain constant for springs in which the cushioning is effected by throttling the air in the spring.

Also any desired compromise between the above three arrangements set forth under (a) to (c) will be possible.

At a given size of the bellows, the pressure of the air cushion determines the spring characteristic, i.e. the increase of the supporting power at a certain compression. The oscillation frequency is determined by the ratio of spring characteristic to the mass to be cushioned. Inasmuch as the acceleration due to gravity is constant, at least along a longitude of the earth, the natural frequency will be constant when the ratio of spring characteristic or spring rate to the weight to be cushioned, i.e. to the load on the spring, is constant. The damping of the oscillations is determined by the flow resistance of the medium passing through a restriction, i.e. with air springs in which the damping is effected by throttling the air enclosed in the spring member, the damping of the oscillations is determined by the air passing through the restriction. The flow resistance is proportional to the density of the air which density is dependent on the pressure. Thus, by controlling the air pressure in the air cushion, it is possible to control the damping.

*Structural arrangement*

Referring now to the drawings in detail, Fig. 1 shows a graph in which the pressure P of the air cushion in the spring bellows is plotted over the ordinate, whereas the compression L of the spring bellows is plotted over the abscissa. The solid lines in the graph of Fig. 1 illustrate the course of the compression of the spring bellows under the load of one and two tons respectively at decreasing inner pressure while the quantity of air enclosed in the air cushion is controlled accordingly. The dot-dash lines illustrate the relationship between the compression of the bellows and the pressure of the air cushion in the bellows at a certain quantity of air $J=a$ kilograms of air enclosed in the air cushion. If, for instance, a spring bellows compressed to the height $A_1$, in which the quantity of air $J=a$ kilograms of air is enclosed, is, in conformity with point A, under a load of $G_1=1.0$ tons, it will be seen from Fig. 1 that if the enclosed quantity of air J remains unchanged, at a load of $G_2=2.0$ tons in conformity with point D of Fig. 1, the bellows will be compressed to the height $A_2$. Holding the load of two tons constant, air may now be pressed into the spring bellows. As a result thereof, the relationship between pressure in the air cushion and the compression of the bellows will change in conformity with the uppermost graph. Depending on the quantity of air additionally pressed into the air cushion, the points A', B or C are reached. In this connection, A' designates a point which indicates the same compression $A_1$ of the bellows as the starting point A, whereas point B with a less compressed bellows designates that inner pressure of the bellows at which the same cushioning of the spring operation is obtained as in point A. Point C designates a condition at which the spring together with the mass loading the same has the same fundamental frequency as in point A which means that during the change from point A to point C, the spring characteristic has changed at the same ratio, in this particular instance at the ratio of 1:2 as the mass acting as load upon the spring. The control member according to the present invention permits a control of the quantity of air enclosed in the bellows in such a way that when changing the load acting upon the spring, for instance from a condition according to point A of Fig. 1, conditions according to point A', B or C may selectively be obtained.

Figure 2:
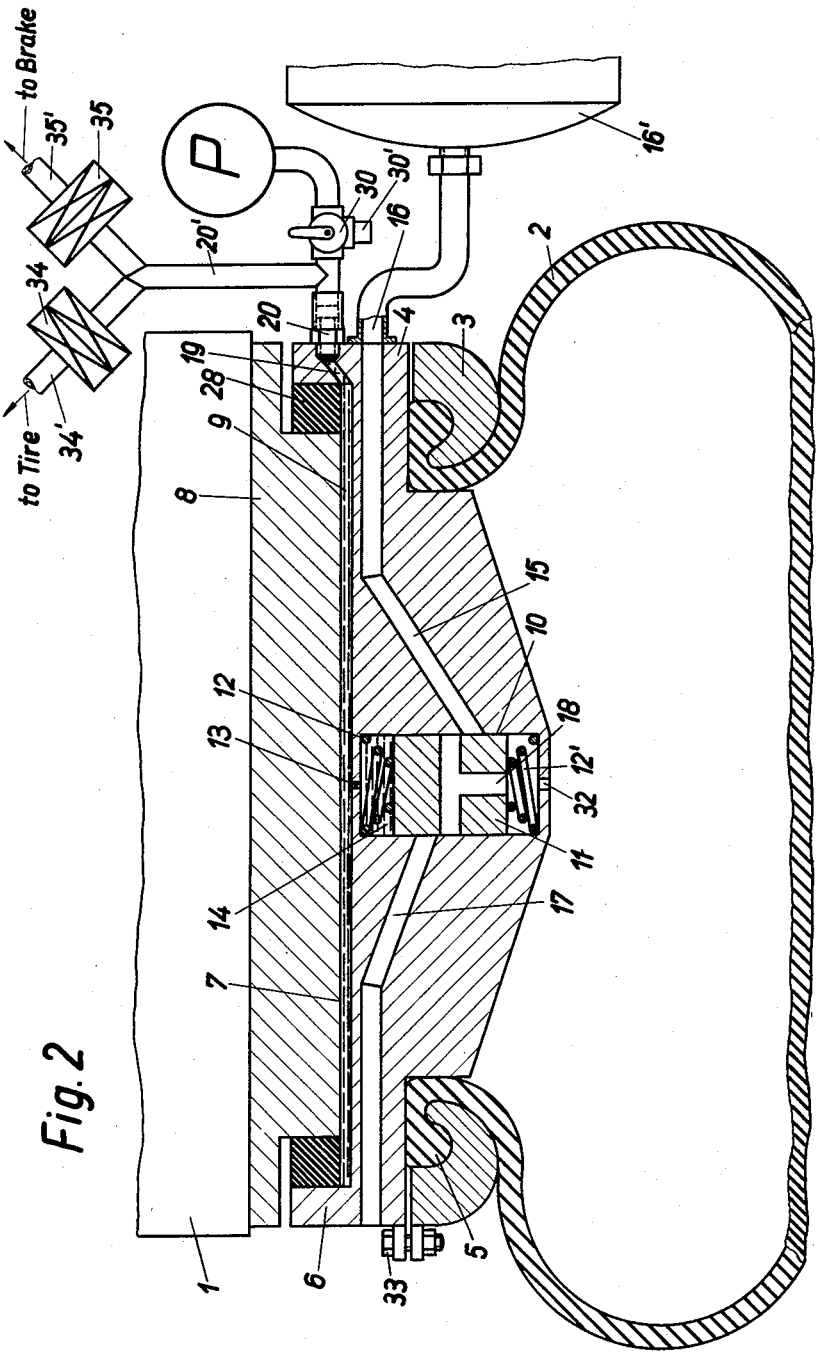
Figs. 2 and 3 illustrate by way of example two different embodiments of a control mechanism according to the invention.

Referring now to Fig. 2, this figure shows the vehicle chassis 1 and the upper portion of a spring bellows 2. The bellows 2 is by means of a clamping ring 3 fixedly connected to a bottom plate or closure member 4. This connection is secured by a bead 5 on the bellows 2. The clamping ring 3 is connected to the bottom plate 4 by bolts 33 (one bolt only being shown). The bottom plate 4 is provided with an annular extension 6 confining a cylindrical recess into which extends a cylindrical pressure portion 7 of a holding member or intermediate member 8 connected to the chassis 1. Arranged between the annular extension 6 and the pressure portion 7 is an elastic rubber seal 28 fixedly connected to the two parts 6 and 7. In this way, there will remain a chamber 9 between the bottom plate 4 and the pressure portion 7. This chamber is filled with a liquid. The bottom plate 4 is furthermore provided with a cavity defining a control cylinder 10. Reciprocably mounted in the control cylinder 10 is a control piston 11 which is supported by two springs 12 and 12'. The chamber 9 communicates through a restriction 13 with the upper chamber 14 of the control cylinder 10. The bottom plate 4 is provided with a passage 15 which on one hand leads into control cylinder 10 and on the other hand is adapted to communicate with a connection 16 leading to an air pressure storage chamber 16'.

Bottom plate 4 is furthermore provided with a second passage 17 which is adapted to establish communication between the interior of control cylinder 10 with the atmosphere. The control piston 11 has a T-shaped passage 18 arranged in such a way that the control piston 11 when occupying a position intermediate its end positions will close the inner ends of both passages 15 and 17. When occupying its uppermost end position, control piston 11 will establish communication between the interior of bellows 2 and passage 17 leading into the atmosphere. When occupying its lowermost end position, control piston 11 will establish communication between the interior of the bellows 2 and the air pressure storage chamber 16' through the intervention of passage 15 and connection 16.

Communication between the lower chamber of the control cylinder 10 and the interior of the bellows 2 is established through a restriction 32.

*Operation of the arrangement of Fig. 2*

The load on the spring member is conveyed from the vehicle chassis 1 and holding member 8 upon the pressure portion 7 and from the latter upon the liquid in chamber 9. From here the said force is conveyed to the bottom plate 4 and through the latter acts upon the spring member formed by the bellows 2 and the air cushion enclosed therein. When the load acting on vehicle chassis 1 increases, the pressure in hollow chamber 9 will increase to a greater extent than the pressure of the air cushion in the elastic bellows 2. This is due to the fact that the bellows 2 is compressed to a greater extent and consequently the pulling force conveyed by bellows 2 through ring 3 to bottom plate 4 will decrease. Consequently, the pressure in chamber 14 formed by the upper portion of control cylinder 10 and acting upon the upper surface of control piston 11 is higher than the pressure acting upon the bottom surface of control piston 11 so that the latter will be moved downwardly and the connection between passage 15 and the air cushion in bellows 2 will be established through the T-shaped passage 18 so that air will flow into the bellows until a pressure balance has been established between the compressed air cushion and the chamber 9, and thus control piston 11 returns to its normal position in which both passages 15 and 17 are closed off by piston 11.

If it is intended that another ratio between the pressure in the air cushion and the load acting upon the spring member is to be established, this may be effected by changing the fluid filling in chamber 9 in such a way that the elastic sealing ring 28 will be under pre-load and by means of this pre-load or pre-tension will press upon the liquid entrapped in chamber 9. To this end, chamber 9 communicates through a short passage 19 with a connecting nipple 20 leading to a three-way valve 30. Valve 30 may be actuated selectively so that pressure fluid is either discharged from chamber 9, through a nozzle 30', or chamber 9 is connected to a pump P which presses additional liquid into chamber 9.

If it is intended to control the air pressure in the tire of the wheel of the vehicle in conformity with the respective load, a control device 34 may be connected to conduit 20' which communicates with nipple 20. Through the variation of the liquid pressure inside chamber 9 the control device 34 controls the air pressure in the tire. Communication between control device 34 and the tire (which is not shown in the drawing) is established by conduit 34'.

If it is furthermore intended to control the braking pressure of a brake acting upon the wheels of the axle associated with the respective spring element in such a way that the maximum possible braking torque pertaining to the respective load will be obtained without the danger of blocking the wheel, a control device 35 may be connected to conduit 20'. By varying the liquid pressure inside chamber 9, the control device 35 controls the braking pressure. Communication between control device 35 and the brake (which is not shown in the drawing) is established by conduit 35'.

Figure 3:
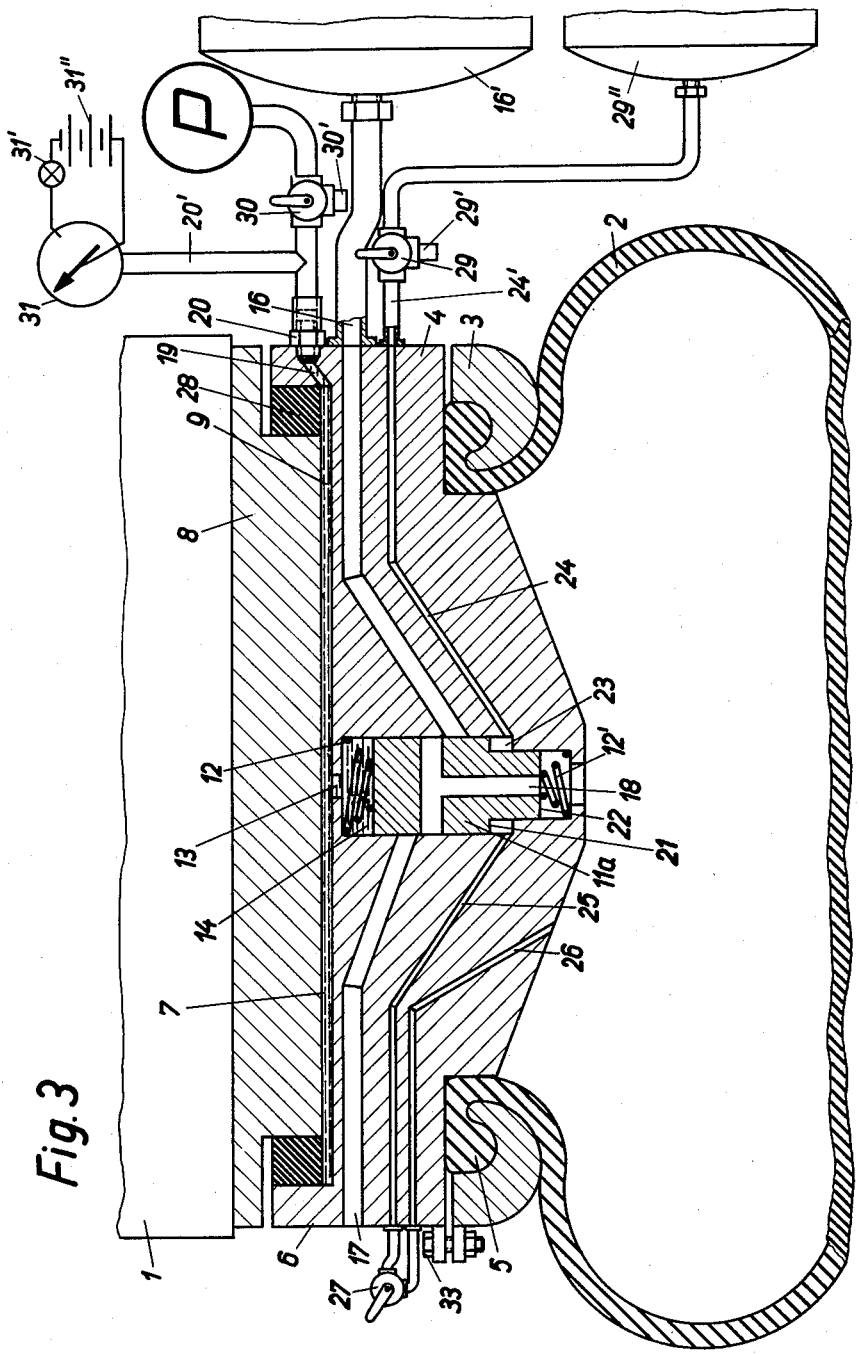

Fig. 3 illustrates a further development of an arrangement according to the present invention. According to Fig. 3, the lower portion of control piston 11a is provided with a step so that the lower piston portion will have an annular piston surface 21 and a circular piston surface 22. The arrangement is such that the total of the annular surface 21 and of the circular surface 22 equals the surface which is effective in causing control piston 11a to close chamber 14. Ahead of the annular surface 21 of piston 11 there is arranged an annular chamber 23 which by means of a passage 24 communicates with a conduit 24' said conduit leading to a three-way valve 29 and an air pressure storage chamber 29''. By this arrangement the pressure in the annular chamber 23 can be controlled. Furthermore, annular chamber 23 communicates through a passage 25 with valve 27 which in its turn communicates with a passage 26 leading into an air cushion chamber partly confined by spring bellows 2.

*Operation of the arrangement of Fig. 3*

Normally, valve 27 is open so that air can pass freely through passages 25 and 26 from the air cushion chamber in bellows 2 into the annular chamber 23. In this way, the same pressure will prevail in the annular chamber 23 as in the air cushion enclosed by bellows 2. In this instance, the connecting conduit communicating with passage 24 is closed by valve 29.

The pressure in annular chamber 23 can be changed at will by establishing communication between the annular chamber 23 and the air pressure storage chamber 29'' by opening valve 29 and closing valve 27. In this way it is possible to vary at random the position to which control piston 11a varies or adjusts the air cushion enclosed in the spring bellows, for instance in such a way that the maximum extension of bellows 2 will be obtained in order, in this way, to lift the vehicle chassis as high as possible.

The pressure in annular chamber 23 can be released by adjusting valve 29 so that the air contained in the annular chamber 23 can escape through nozzle 29'.

A feature which could also be incorporated in an arrangement of Fig. 2 is shown in the upper right hand corner of Fig. 3. This consists of a conduit 20' communicating with nipple 20 and leading to a pressure gauge 31. With this gauge it is possible to measure the load on the axles or the loaded useful load if the pressure gauge is gauged in tons. It is often an advantage if a signal is given off in response to the maximum permissible load being reached. To this purpose an electric signal lamp 31' may be provided which is powered by a battery 31'' if a certain pressure is reached and a contact inside pressure gauge 31 has been closed.

Fig. 4 illustrates a still further development according to the present invention. As will be evident from the drawing, two air spring elements are provided. The control cylinder has been designed as separate unit and is being acted upon by both spring elements. In particular, 8' and 8'' are the holding members of both spring elements; 4' and 4'' which are the bottom plates respectively forming chambers 9' and 9'' filled with liquid. Through conduits 36 and 37 chambers 9' and 9'' communicate with each other and the upper chamber 38 of control unit 39. Connected to the conduit system 36, 37 is a pump P and a three-way valve 40. The constructive elements of the spring elements are similar to those shown in Figs. 2 or/and 3. The left spring element of Fig. 4 shows in detail the connection between the lower part of bellows 2' which is secured by a bead 41 to a plate 42. This plate 42 may in turn be fastened to other parts of the undercarriage of the vehicle, e.g. the axle.

Referring now to the control unit 39 this consists of a liquid filled chamber 38 which is closed off by a metal bellows 43. The flat upper portion of the bellows 43 is connected to a rod 44 with a control piston 45 with a T-shaped passage 46. Piston 45 reciprocates in a control cylinder 47 which is part of the lower, air-filled portion 48 of the unit 39.

Similar to the construction of Fig. 2, the T-shaped passage 46 of piston 45 is arranged in such a way that the piston 45 when occupying a position intermediate its end positions will close the inner ends of both conduits 49 and 50. Conduit 49 leads to an air pressure storage chamber 51, and conduit 50 leads into the atmosphere.

The lower chamber 52 of the control cylinder 47 communicates through conduit 53 with the inside of both bellows 2' and 2''.

Finally, the air filled chamber 48 communicates by conduits 54 also with the inside of both bellows 2' and 2''.

*Operation of the arrangement of Fig. 4*

As will be evident to any skilled in the art, the operation of the arrangement according to Fig. 4 is analogous to the operation of the arrangement of Fig. 2. The interposition of a metal bellows 43 has the advantage that the upper surface of piston 45 is not in contact with the liquid. In this way no liquid can leak into the conduit 53.

It is, of course, to be understood that the present invention is by no means limited to the particular constructions shown in the drawings, but also comprises any modifications within the scope of the appended claims.

What I claim is:

1. In an air spring arrangement, especially for motor vehicles: a bellows adapted to be charged with air, a closure member mounted on and closing the upper end of said bellows, said closure member comprising a cylinder having a first passage leading from said cylinder into the interior of said bellows, a piston reciprocably mounted in said cylinder and having first effective surface means adapted to be acted upon by air pressure conveyed from said bellows through said first passage and also having second effective surface means opposite said first effective surface means, said closure member being provided with first conduit means arranged for connection with a compressed air storage chamber and leading into said cylinder, said closure member also being provided with second conduit means leading from said cylinder into the atmosphere, a holding member adapted to be connected to the chassis of a vehicle and confining with said closure member a liquid receiving chamber, and a second passage leading from said cylinder into said liquid receiving chamber for conveying liquid pressure from said last mentioned chamber to said second effective piston surface means, said piston including passage means and being operable in response to its movement into a first end position to convey compressed air from said first conduit means to said first effective surface means and in response to its movement into its other end position to establish communication between the interior of said bellows and said second conduit means, said piston additionally being movable into an intermediate position for preventing communication of the interior of said cylinder with said first and second conduit means.

2. In an air spring arrangement, especially for motor vehicles: a bellows adapted to be charged with air, a closure member mounted on and closing the upper end of said bellows, said closure member comprising a cylinder having a first passage leading from said cylinder into the interior of said bellows, a piston reciprocably mounted in said cylinder and having first effective surface means adapted to be acted upon by air pressure conveyed from said bellows through said first passage and also having second effective surface means opposite said first effective surface means, said closure member being provided with first conduit means arranged for connection with a compressed air storage chamber and leading into said cylinder, said closure member also being provided with second conduit means leading from said cylinder into the atmosphere, a holding member adapted to be connected to the chassis of a vehicle and confining with said closure member a liquid receiving chamber, said holding member and said closure member being movable relative to each other, elastic supporting means interposed between said holding member and said closure member for receiving different portions of the load in conformity with the filling of said liquid receiving chamber, and a second passage leading from said cylinder into said liquid receiving chamber for conveying liquid pressure from said last mentioned chamber to said second effective piston surface means, said piston including passage means and being operable in response to its movement into a first end position to convey compressed air from said first conduit means to said first effective surface means and in response to its movement into its other end position to establish communication between the interior of said bellows and said second conduit means, said piston additionally being movable into an intermediate position for preventing communication of the interior of said cylinder with said first and second conduit means.

3. An arrangement according to claim 2, in which an elastic seal connected to said closure member and said holding member is provided as elastic supporting means.

4. In an air spring arrangement, especially for motor vehicles: a bellows adapted to be charged with air, a closure member mounted on and closing the upper end of said bellows, said closure member comprising a cylinder having a first passage leading from said cylinder into the interior of said bellows, a piston reciprocably mounted in said cylinder and having first effective surface means adapted to be acted upon by air pressure conveyed from said bellows through said first passage and also having second effective surface means opposite said first effective surface means, said closure member being provided with first conduit means arranged for connection with a compressed air storage chamber and leading into said cylinder, said closure member also being provided with second conduit means leading from said cylinder into the atmosphere, a holding member adapted to be connected to the chassis of a vehicle and confining with said closure member a liquid receiving chamber, valve means communicating with said liquid receiving chamber and operable selectively for admitting liquid to or discharging liquid from said liquid receiving chamber, and a second passage leading from said cylinder into said liquid receiving chamber for conveying liquid pressure from said last mentioned chamber to said second effective piston surface means, said piston including passage means and being operable in response to its movement into a first end position to convey compressed air from said first conduit means to said first effective surface means and in response to its movement into its other end position to establish communication between the interior of said bellows and said second conduit means, said piston additionally being movable into an intermediate position for preventing communication of the interior of said cylinder with said first and second conduit means.

5. In an air spring arrangement, especially for motor vehicles: a bellows adapted to be charged with air, a closure member mounted on and closing the upper end of said bellows, said closure member comprising a cylinder having a first passage leading from said cylinder into the interior of said bellows, a piston reciprocably mounted in said cylinder and having first effective surface means adapted to be acted upon by air pressure conveyed from said bellows through said first passage and also having second effective surface means opposite said first effective surface means, said closure member being provided with first conduit means arranged for connection with a compressed air storage chamber and leading into said cylinder, said closure member also being provided with second conduit means leading from said cylinder into the atmosphere, a holding member adapted to be connected to the chassis of a vehicle and confining with said closure member a liquid receiving chamber, pumping means communicating with said liquid receiving chamber and when in operation increasing the volume of liquid in said liquid receiving chamber, and a second passage leading from said cylinder into said liquid receiving chamber for conveying liquid pressure from said last mentioned chamber to said second effective piston surface means, said piston including passage means and being operable in response to its movement into a first end position to convey compressed air from said first conduit means to said first effective surface means and in response to its movement into its other end position to establish communication between the interior of said bellows and said second conduit means, said piston additionally being movable into an intermediate position for preventing communication of the interior of said cylinder with said first and second conduit means.

6. An arrangement according to claim 1, in which said second passage leading from the interior of said cylinder into said liquid receiving chamber includes a restriction.

7. An arrangement according to claim 1, which includes a pressure gauge communicating with said liquid receiving chamber.

8. An arrangement according claim 7, which includes signaling means associated with said pressure gauge for giving off a signal in response to the maximum permissible load being reached.

9. In an air spring arrangement, especially for motor vehicles, having an air receiving bellows arranged intermediate a vehicle chassis and a pneumatic tire: a closure member mounted on and closing the upper end of said bellows, said closure member comprising a cylinder having a first passage leading from said cylinder into the interior of said bellows, a control piston reciprocably mounted in said cylinder and having first effective surface means adjacent said first passage and also having second effective surface means opposite said first effective surface means, said closure member being provided with first conduit means arranged for connection with a compressed air storage chamber and leading into said cylinder, said closure member also being provided with second conduit means leading from said cylinder into the atmosphere, a holding member interposed between said chassis and said closure member and confining with said closure member a liquid receiving chamber, a second passage leading from said cylinder into said liquid receiving chamber for conveying liquid pressure from said last mentioned chamber to said second effective piston surface means, said piston including passage means and being operable in response to its movement into a first end position to convey compressed air from said first conduit means to said first effective surface means and in response to its movement into its other end position to establish communication between the interior of said bellows and said second conduit means, said piston additionally being movable into an intermediate position for preventing communication of the interior of said cylinder with said first and second conduit means, control means for controlling the air in said tires, and pressure responsive means responsive to the liquid pressure in said liquid receiving chamber for controlling said control means.

10. An air spring arrangement for motor vehicles including a bellows interposed between the vehicle chassis and a wheel axle and also including a fluid operable brake for braking said axle: a closure member mounted on and closing the upper end of said bellows, said closure member comprising a cylinder having a first passage leading from said cylinder into the interior of said bellows, a piston reciprocably mounted in said cylinder and having first effective surface means adapted to be acted upon by air pressure conveyed from said bellows through said first passage and also having second effective surface means opposite said first effective surface means, said closure member being provided with first conduit means arranged for connection with a compressed air storage chamber and leading into said cylinder, said closure member also being provided with second conduit means leading from said cylinder into the atmosphere, a holding member adapted to be connected to the chassis of a vehicle and confining with said closure member a liquid receiving chamber, pressure responsive control means communicating with said pressure receiving chamber and operatively connected with said brake for controlling the same, and a second passage leading from said cylinder into said liquid receiving chamber for conveying liquid pressure from said last mentioned chamber to said second effective piston surface means, said piston including passage means and being operable in response to its movement into a first end position to convey compressed air from said first conduit means to said first effective surface means and in response to its movement into its other end position to establish communication between the interior of said bellows and said second conduit means, said piston additionally being movable into an intermediate position for preventing communication of the interior of said cylinder with said first and second conduit means.

11. An arrangement according to claim 1, in which said first passage leading from said cylinder into the interior of said bellows includes a restriction.

12. In an air spring arrangement, especially for motor vehicles: a bellows adapted to be charged with air, a closure member mounted on and closing the upper end of said bellows, said closure member comprising a cylinder having a first passage leading from said cylinder into the interior of said bellows, a piston reciprocably mounted in said cylinder and having first effective surface means adapted to be acted upon by air pressure conveyed from said bellows through said first passage and also having second effective surface means opposite said first effective surface means, at least one of said effective surface means being formed by a step in said piston and the adjacent end surface of said piston, said closure member being provided with first conduit means arranged for connection with a compressed air storage chamber and leading into said cylinder, said closure member also being provided with second conduit means leading from said cylinder into the atmosphere, a holding member adapted to be connected to the chassis of a vehicle and confining with said closure member a liquid receiving chamber, and a second passage leading from said cylinder into said liquid receiving chamber for conveying liquid pressure from said last mentioned chamber to said second effective piston surface means, said piston including passage means and being operable in response to its movement into a first end position to convey compressed air from said first conduit means to said first effective surface means and in response to its movement into its other end position to establish communication between the interior of said bellows and said second conduit means, said piston additionally being movable into an intermediate position for preventing communication of the interior of said cylinder with said first and second conduit means.

13. In an air spring arrangement, especially for motor vehicles: a bellows adapted to be charged with air, a closure member mounted on and closing the upper end of said bellows, said closure member comprising a cylinder having a first passage leading from said cylinder into the interior of said bellows, a piston reciprocably mounted in said cylinder and having first effective surface means adapted to be acted upon by air pressure conveyed from said bellows through said first passage and also having second effective surface means opposite said first effective surface means, said first effective surface means being formed by a step in said piston and by that end surface of said piston which is adjacent said first passage, restricted conduit means establishing communication between the cylinder portion adjacent said step in said piston and the interior of said bellows, said closure member being provided with first conduit means arranged for connection with a compressed air storage chamber and leading into said cylinder, said closure member also being provided with second conduit means leading from said cylinder into the atmosphere, a holding member adapted to be connected to the chassis of a vehicle and confining with said closure member a liquid receiving chamber, and a second passage leading from said cylinder into said liquid receiving chamber for conveying liquid pressure from said last mentioned chamber to said second effective piston surface means, said piston including passage means and being operable in response to its movement into a first end position to convey compressed air from said first conduit means to said first effective surface means and in response to its movement into its other end position to establish communication between the interior of said bellows and said second conduit means, said piston additionally being movable into an intermediate position for preventing communication of the interior of said cylinder with said first and second conduit means.

14. An arrangement according to claim 13, which includes a first adjustable valve arranged in said restricted conduit means, and which also includes a second adjustable valve adapted to be connected with a compressed air source and communicating with the cylinder portion adjacent said step in said piston.

15. An arrangement according to claim 14, in which said second valve has operatively connected thereto a control member responsive to a certain force acting upon the vehicle in substantially transverse direction thereto for adjusting said second valve and thereby the pressure acting upon the step of said piston.

16. In an air spring arrangement, especially for motor vehicles, the combination of: a bellows adapted to be charged with air, a closure member mounted on and closing the upper end of said bellows, a holding member adapted to be connected to the chassis of a vehicle and confining with said closure member a liquid receiving chamber of variable capacity, a cylinder, a double acting piston reciprocably mounted in said cylinder, first restricted passage means establishing communication between one of the effective piston surfaces and said liquid receiving chamber, second restricted passage means establishing communication between the interior of said bellows and another effective surface of said piston, other effective surface being effective in opposite direction of said first mentioned effective piston surface, first conduit means leading from said cylinder into the atmosphere, and second conduit menas arranged for communication with a compressed air storage chamber, said piston being adapted to control said first and second conduit means in conformity with the pressures acting upon said effective piston surfaces.

17. In an air spring arrangement, especially for motor vehicles: a bellows adapted to be charged with air, a closure member mounted on and closing the upper end of said bellows, a holding member adapted to be connected to the chassis of a vehicle and confining with said closure member a liquid receiving chamber of variable capacity, a cylinder, a double acting piston reciprocably mounted in said cylinder, first restricted passage means establishing communication between one of the effective piston surfaces and said liquid receiving chamber, second restricted passage means establishing communication between the interior of said bellows and another effective surface of said piston, said other effective surface being effective in opposite direction of said first mentioned effective piston surface, first conduit means leading from said cylinder into the atmosphere, an auxiliary compressed air container, and second conduit means arranged for connection with said auxiliary container, said piston being adapted to control said first and second conduit means in conformity with the pressures acting upon said effective piston surfaces.

18. In an air spring arrangement for a motor vehicle having a chassis and an axle as well as a plurality of air containing bellows interposed between said axle and said chassis: a plurality of closure members respectively mounted on and closing said bellows, holding means connected to said chassis and confining with said closure members liquid receiving container means of variable capacity, a cylinder common to all of said bellows pertaining to said axle, a double acting piston reciprocably mounted in said cylinder, restricted passage means establishing communication between opposite ends of said piston on one hand and said liquid receiving container and said bellows respectively on the other hand, first conduit means arranged for connection with a compressed air storage chamber and leading to said cylinder, and second conduit means communicating with said cylinder and leading to the atmosphere, said piston being adapted in response to the pressure in said liquid receiving chamber and said bellows to control communication of the interior of said bellows with said atmosphere or said storage chamber or to prevent such communication.

19. In an air spring arrangement, especially for motor vehicles, which includes an air spring element, means for connecting said air spring element to a support, a pressure measuring container interposed between said means and said air spring element, a cylinder, a control piston having two oppositely effective surface means and being reciprocably mounted in said cylinder, first passage means for conveying the pressure in said pressure measuring container to one of said piston surface means, second passage means for conveying the pressure in said air spring element to the oppositely located effective piston surface means, and air supply and air discharge conduit means controlled by said piston for supplying air to and discharging air from said air spring element.

20. In an air spring system for a motor vehicle having a chassis, wheel axle means, and a bellows interposed therebetween and including an air cushion: a cylinder body connected to the upper end of said bellows and comprising a control cylinder, a compressed air storage chamber, first conduit means leading from said storage chamber to said control cylinder, said cylinder body comprising second conduit means leading into the atmosphere, control piston means reciprocably mounted in said control cylinder and having a first effective area and an oppositely located second effective area, means connected to said chassis so as to be movable therewith and confining with said cylinder body a chamber adapted to receive a liquid, pumping means for supplying liquid under pressure to said chamber, said cylinder body having first restricted passage means leading from one end of said area to the pressure in said chamber, said cylinder body area to the pressure in said chambers, said cylinder body having second restricted passage means leading from the other end of said control cylinder into said bellows to expose said second piston area to the pressure of the air cushion in said bellows, the arrangement being such that said control piston is normally held in a position of equilibrium in which said control piston prevents communication between the interior of said bellows with either one of said first and second conduit means, said control piston being movable into a first communicating position in response to the pressure on said second piston area to a certain extent to thereby establish fluid communication between said first conduit means and the interior of said bellows, said control piston also being movable into a second effective position in response to the pressure acting on said second control piston area exceeding the pressure on said first control piston area by a certain amount to thereby establish communication between the interior of said bellows and said second conduit means.

21. In combination with a vehicle chassis, an arrangement for controlling the volume of air in an air spring system suspended on said chassis, which includes: a bellows adapted to receive air and to deform under a certain load acting thereupon, a closure member mounted on that end of said bellows which is adjacent said chassis, an intermediate member interposed between said closure member and said chassis and connected to the latter for movement therewith in vertical direction, said intermediate member confining with said closure member a chamber adapted to be filled with liquid, a source of liquid arranged for communication with said chamber for filling the same with liquid, said closure member comprising a cylinder having restricted openings respectively directly communicating with said chamber in the interior of said bellows, and a control member reciprocably mounted in said cylinder and having oppositely located surface areas thereof in direct communication with said chamber and the interior of said bellows through said restrictions, said closure member also comprising conduit means controlled by said control member and respectively leading to a discharge and to said source of liquid.

References Cited in the file of this patent

UNITED STATES PATENTS

| 673,011 | Annable | Apr. 30, 1901 |
| 1,544,850 | Messier | July 7, 1925 |
| 2,620,182 | Marston | Dec. 2, 1952 |

FOREIGN PATENTS

| 1,020,770 | France | Nov. 19, 1952 |
| 1,155,991 | France | Dec. 9, 1957 |